United States Patent [19]
Fujiwara et al.

[11] Patent Number: 4,778,255
[45] Date of Patent: Oct. 18, 1988

[54] DIAPHRAGM DRIVING MECHANISM

[75] Inventors: Yutaka Fujiwara; Hiroshi Yamamoto, both of Kanagawa, Japan

[73] Assignee: Canon Kabushiki Kaisha, Tokyo, Japan

[21] Appl. No.: 129,920

[22] Filed: Dec. 3, 1987

Related U.S. Application Data

[63] Continuation of Ser. No. 727,012, Apr. 25, 1985, abandoned.

[30] Foreign Application Priority Data

Apr. 27, 1984 [JP]  Japan ................................. 59-84163

[51] Int. Cl.⁴ .......................... G02B 26/02; G02B 7/14
[52] U.S. Cl. ..................... 350/269; 354/230; 354/274
[58] Field of Search .............. 350/269; 354/271.1, 354/274, 453, 230

[56] References Cited

U.S. PATENT DOCUMENTS

| | | | |
|---|---|---|---|
| 4,284,339 | 8/1981 | Borowski et al. | 354/274 |
| 4,327,977 | 5/1982 | Sharp | 354/230 |
| 4,378,146 | 3/1983 | Suzuki et al. | 350/269 |

Primary Examiner—John K. Corbin
Assistant Examiner—Paul M. Dzierzynski
Attorney, Agent, or Firm—Toren, McGeady & Associates

[57] ABSTRACT

A diaphragm driving mechanism which includes diaphragm blades, a diaphragm drive member for driving motion of the diaphragm blades, a support member for pivotally supporting the diaphragm blades, a magnet member fixedly secured to the diaphragm drive member or the support member and movable in a direction parallel with an optical axis, coils constituting an electromagnetic induction mechanism together with the magnet member, and a bias member imparting a force parallel to the optical axis to the magnetic member to cause the magnetic member to be displaced relative to the coils.

4 Claims, 6 Drawing Sheets

DIAPHRAGM DRIVING MECHANISM

This is a continuation of application Ser. No. 727,012, filed Apr. 25, 1985, now abandoned.

BACKGROUND OF THE INVENTION

1. Field of the Invention

This invention relates to diaphragm driving mechanisms, and more particularly to an electromagnetically operated diaphragm driving mechanism.

2. Description of the Prior Art

Figure 1:
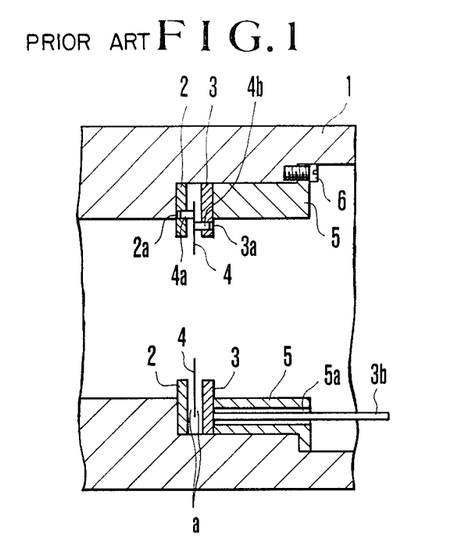
FIG. 1 is a longitudinal section view of a conventional example of the diaphragm device.
Figure 2:
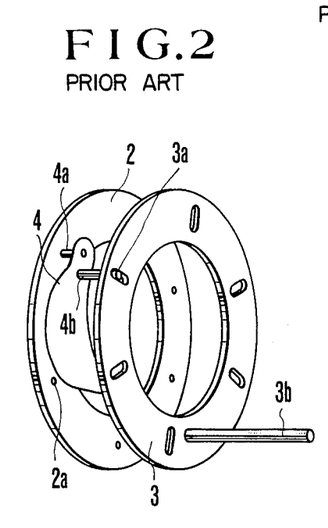
FIG. 2 is a perspective view in enlarged scale of the main parts of the diaphragm device of FIG. 1.

FIGS. 1 and 2 illustrate a conventional example of the diaphragm mechanism with its drive source located externally. 1 is a body tube of a lens mounting fixedly secured to a camera housing (not shown). Fixedly fitted in the body tube 1 is an apertured disc 2 having a plurality of holes 2a in a common circle with its center at the optical axis in equally spaced relation. Another apertured disc 3 as a diaphragm drive member has a plurality of radially elongated slots 3a in equally spaced relation and is positioned at a distance from the first disc 2 to be rotatable about the optical axis. Positioned between these two discs 2 and 3 are a plurality of diaphragm blades 4 out of contact with both discs 2 and 3 by a gap "a". Each of the blades 4 has pins 4a and 4b on opposite surface thereof which extend respectively into the hole 2a and the slot 3a. A retainer ring 5 behind the diaphragm drive disc 3 is fixedly mounted to the body tube 1 by fastener screws 6. A drive connection rod 3b extends rearwardly of the diaphragm drive disc 3 through an arcuate opening 5a of the retainer ring 5 into a control mechanism for the diaphragm in the camera body.

In operating the conventional example of the diaphragm of such construction, the drive connection rod 3b is turned about the optical axis, so that the diaphragm drive disc 3 turns relative to the disc 2, whereby the draphragm blades 4 are driven to pivotally move.

By the way, in order to ensure that the diaphragm blades 4 operate smoothly, it has been the general practice to make provision for the spacing "a". For high performance of the optical instrument, the diaphragm blades 4 must be positioned to a high accuracy in the axial direction. Despite this, use of the gap "a" has been avoided with the result that the diaphragm blades 4 constantly fluctate in the axial direction. This leads to deterioration in the optical performance. In such a manner, the requirement for smooth operation is not compatible with that for high accuracy, causing a very serious problem.

Figure 3:
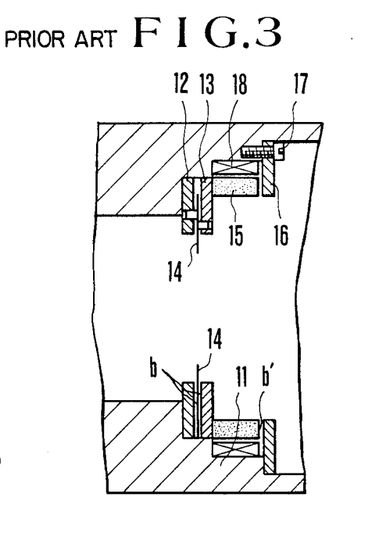
FIG. 3 is a longitudinal section view of another conventional example of the diaphragm device of the electromagnetic drive type.

Further, recently, a drive source using electromagnetic force had been increasingly used in operating the diaphragm. FIG. 3 illustrates a conventional example of such electromagnetically driven diaphragm mechanism. Because this type of motor or electromagnet as the drive source cannot exert a force of larger magnitude than its size limits, it is necessary to provide a gap similar to that in the first conventional example described above.

In FIG. 3, a body tube 11 of a lens mounting contains stationary and rotatable apertured discs 12 and 13 between which diaphragm blades 14 are positioned at a distance "b" from each of the discs 12 and 13. The diaphragm drive disc 13 is connected to a magnet ring 15. A retainer ring 16 behind the magnet ring 15 at a gap "b'" is fixedly mounted to the body tube 11 by screw fasteners 17. On the outer periphery of the magnet ring 15 there is a driving coil 18 which is fixedly fitted in the inner diameter of the body tube 11, and is spaced by a short radial distance from the magnet ring 15.

In operating the electromagnetic drive type diaphragm mechanism of such construction, when the driving coil 18 is supplied with current from a drive control circuit (not shown), the diaphragm drive disc 13 turns moving the diaphragm blades 14.

However, even in this conventional example of the electromagnetic drive type, because of its having the spaces "b" and "b'", the diaphragm blades 14 constantly change their axial positions, causing a large problem by deteriorating the optical performance.

Figure 4A:
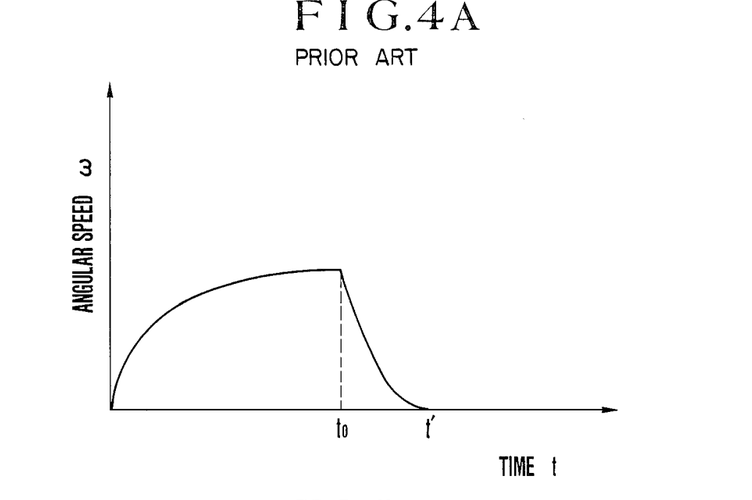
FIGS. 4A and 4B are graphs illustrating a manner in which the diaphragm device of FIG. 3 operates.
Figure 4B:
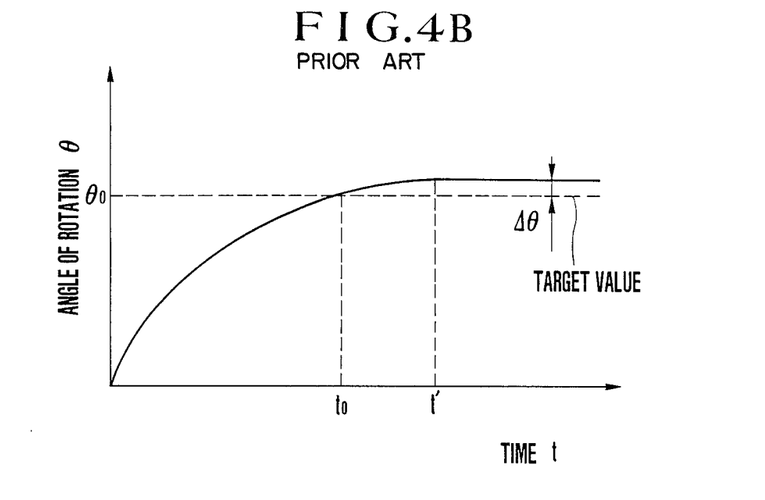

Also, as shown in FIGS. 4A and 4B, the angular speed at which the diaphragm drive disc 13 moves varies with time (FIG. 4A), and the angle of rotation varies with time (FIG. 4B). Because the diaphragm drive disc 13 and the diaphragm blades 14 have inertia, if the current supply to the driving coil 18 is cut off at a time, $t_0$, when the angle of rotation reaches a target value $\theta_0$, the diaphragm drive disc 13 continues to rotate until a time point $t'$, and, therefore, overruns by an angle $\Delta\theta$. For this reason, it is impossible to set the aperture size in a correct value.

As the means for eliminating the above-described problem mention may be made of means for electromagnetically braking the disc, and high degree feedback control means. The former has the problem of increasing space requirements. The latter necessitates a high degree of technology. Both involve factors which increase costs and which cause difficult manufacturing problems.

SUMMARY OF THE INVENTION

With the above-described problems of the conventional example, the present invention has for its object to provide a diaphragm driving mechanism of the electromagnetic drive type in which without the necessity of using peculiar means, when driving the diaphragm, it operates smoothly, and when its operation is terminated, the diaphragm blades can be eeld always in constantly the same axial position, and the size of the aperture defined by the blades can be accurately adjusted to the presetting before thereof.

A feature of the invention is that a magnet ring is fixedly secured to one of a diaphragm blade drive disc and a body tube rotatably supporting the disc, and a diaphragm driving coil is fixedly secured to the other, wherein the diaphragm blade drive disc is urged by a resilient member in an axial direction, and the magnet ring and the diaphragm driving coil are arranged to be movable relative to each other and to take their positions out of radial alignment with each other, whereby when not driving the diaphragm, the diaphragm blades are pressed against a stationary apertured disc by the springing force of the resilient member and when a drive motion is to be imparted to the diaphragm, the energized coil produces a magnetic field by which the magnet ring is impelled against the force of the resilient member so that the diaphragm blades can move without friction on any one of the discs.

The various features of novelty which characterize the invention are pointed out with particularity in the claims annexed to and forming a part of this disclosure. For a better understanding of the invention, its operating advantages and specific objects attained by its use, reference should be had to the drawings and descriptive matter in which there are illustrated and described preferred embodiments of the invention.

DETAILED DESCRIPTION OF THE PREFERRED EMBODIMENTS

Figure 5A:
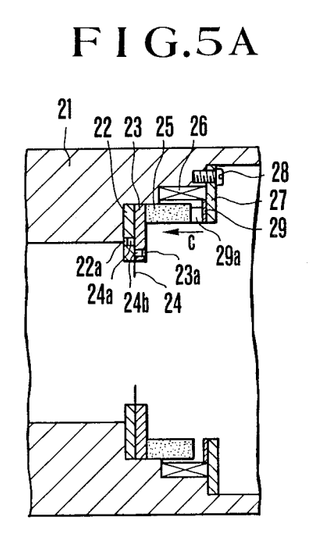
FIGS. 5A and 5B are longitudinal section views of the main parts of an embodiment of a diaphragm driving mechanism according to the present invention, with FIG. 5A showing it when it is not driving the diaphragm, and FIG. 5B showing it when it is driving the diaphragm.
Figure 5B:
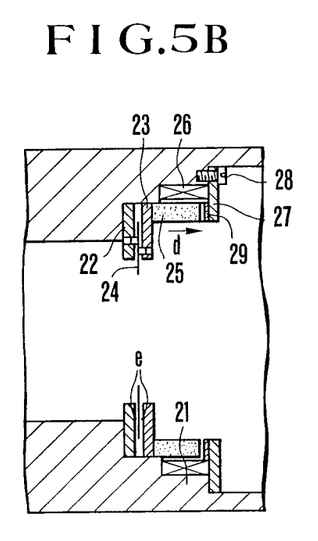
Figure 6:
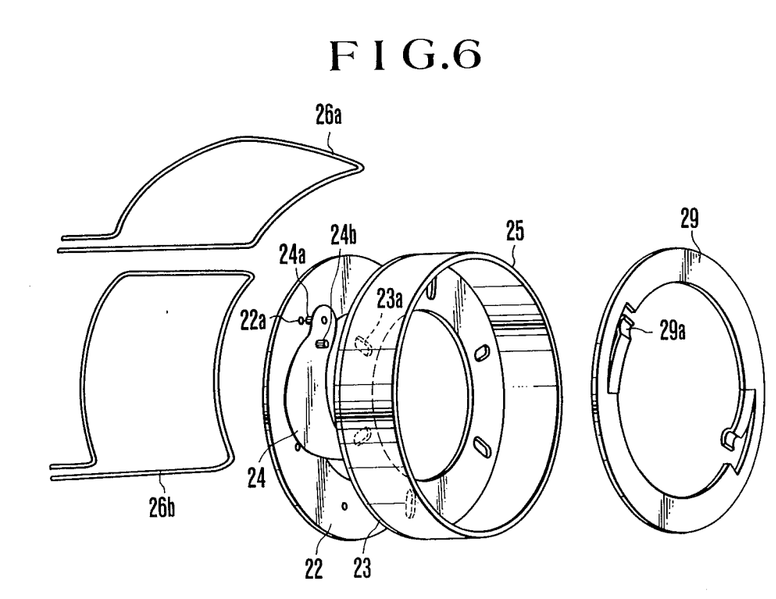
FIG. 6 is an exploded perspective view in enlarged scale of the mechanism of FIGS. 5A and 5B.

FIGS. 5A, 5B and 6 illustrate an embodiment of the diaphragm driving mechanism according to the invention. FIG. 5A in a longitudinal section view illustrates an operative position where the diaphragm blades are at rest, and FIG. 5B in a similar view illustrates another operative positive where the diaphragm blades are moving.

21 is a body tube of a lens mounting. Fixedly fitted in the inner diameter of the body tube 21 are an apertured disc having six holes 22a in a circle with its center at the optical axis in equally spaced relation and a diaphragm driving coil 26 comprising first and second coil elements 26a and 26b for clockwise and counterclockwise rotation separated by an angle of 90° from each other about the optical axis. Another apertured disc 23 as the drive member is rotatably fitted in the inner diameter of the body tube 21 in the rear of the fixed disc 22, and has six radially elongated slots 23a in equally spaced relation. A magnet ring 25 is fixedly mounted to the rear surface of the drive disc 23 by an adhesive agent. Six diaphragm blades 24 are positioned between the fixed and movable discs 22 and 23 and each have two pins 24a and 24b on an opposite surface thereof which exend into the hole 22a and the slot 23a respectively. A retainer ring 27 in the rear of the diaphragm driving coil 26 is fixedly mounted in the inner diameter of the body tube 21 by screw faterners 28. A ring-like resilient member 29 intervenes between the magnet ring 25 and the retainer ring 27, and a pair of arcuate springing leafs 29a formed in inner circumferential portions thereof urge the magnet ring 25 in a direction indicated by an arrow "c", or leftward as viewed in the drawing. Thereby, the diaphragm blades 24 are sandwiched between the fixed disc 22 and the diaphragm drive disc 23 and, therefore, take a prescribed axial position. It is also to be noted that in this position the magnet ring 25 and the coil 26 are offset in an axial direction. Also, the confronting surfaces of the magnet ring 25 and the resilient member 29 are treated by a lubricating coating or grease.

The operation of the diaphragm driving mechanism of such construction is as follows:

When not effecting driving motion of the diaphragm blades, or in the position of FIG. 5A, the magnet ring 25 is moved by the resilient member 29 in the direction of arrow "c" to press the diaphragm blades 24 against the fixed disc 22 through the drive disc 23. Thus, the axial position of the diaphragm blades 24 is accurately adjusted. But, when the first coil element 26a for clockwise rotation of the drive disc 23 is supplied with current from a drive control circuit (not shown), a magnetic force is exerted between the magnet ring 25 and the first coil element 26a, reacting not only in a direction to turn the magnet ring 25 about the optical axis, but also in another direction indicated by arrow "d" in FIG. 5B, that is, to move the magnet ring 25 to the right.

Figure 7A:
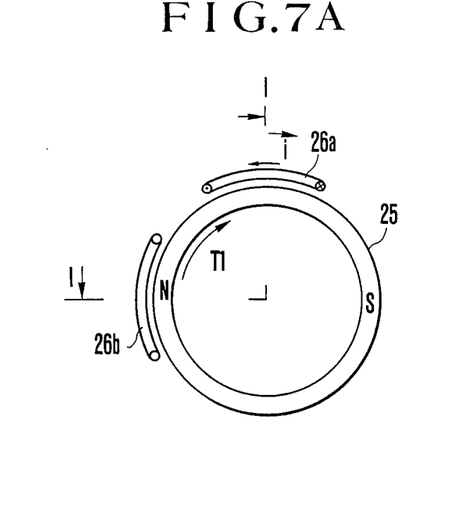
FIGS. 7A, 7B, 8A and 8B illustrate a manner in which the mechanism of FIGS. 5A, 5B and 6 operates.
Figure 7B:
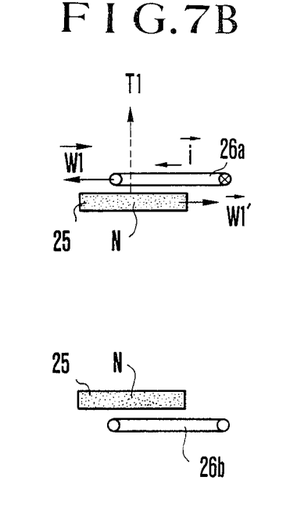
Figure 8A:
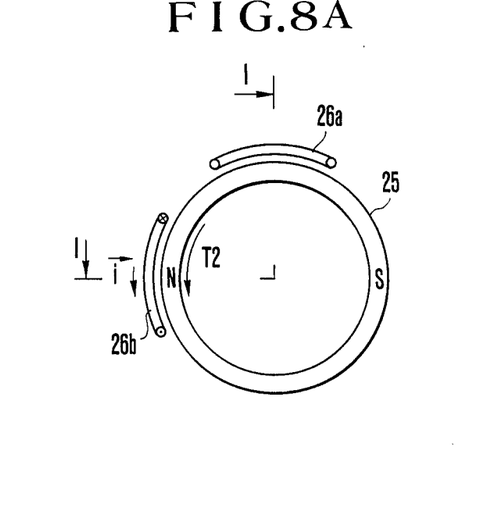
Figure 8B:
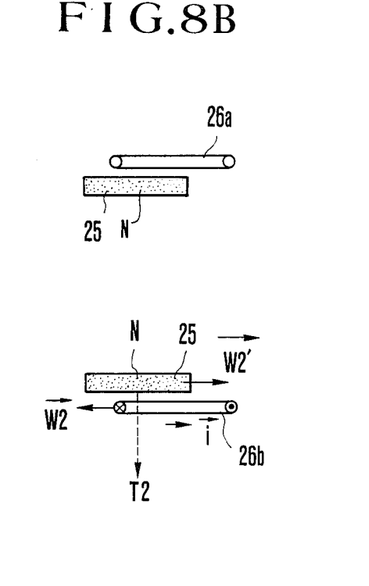

Here, referring to FIGS. 7A, 7B, 8A and 8B, the principle on which the above-described operation of the diaphragm driving mechanism is based will next be explained. FIGS. 7A and 8A are schematic cross-sections of the magnet ring 25 and the diaphragm drive coil 26 of FIG. 5A in a direction perpendicular to the optical axis. FIGS. 7B and 8B are schematic cross-sections taken along lines I—I of FIGS. 7A and 8A respectively.

In FIG. 7A, when current "i" flows through the first coil 26a in the magnetic field B of the magnet ring 25, a clockwise rotating torque T1 appears. At the same time, in FIG. 7B, by the current "i" a force W1 is acted on the coil 26a in the axial direction. But, because the coil 26a is fixed, the magnet ring 25 reacts with a force W1' in the opposite direction. In this case, no current is allowed to flow to the second coil element 26b.

In FIG. 8A, on the other hand, when current "i" flows through the second coil element 26b, a similar principle works so that a counterclockwise rotating torque T2 appears and, at the same time, the magnet ring 25 reacts with a force W2'.

By the above-described operation principle, as the first coil element 26a is energized, the magnet ring 25 and the drive disc 23 move in the direction of arrow "d" in FIG. 5B to create a space "e" between the diaphragm blades and each of the fixed and movable discs 22 and 23. For this reason, the magnet ring 25 rotates smoothly, operating the diaphragm blades 24. And, when rotation of the diaphragm drive disc 23 to a predetermined angular position is completed, the current supply from the drive control circuit is cut off, permitting the resilient member 29 to push the magnet ring 25 and diaphragm drive disc 23 again in the direction of arrow "c" in FIG. 5A and finally to press the diaphragm blades 24 against the fixed disc 22. Thus, the diaphragm blades 24 are adjusted accurately to the prescribed axial position.

In order to turn the magnet ring 25 and the diaphragm drive disc 23 in the reverse direction, the current flow is changed over to the second coil element 26.

Figure 9A:
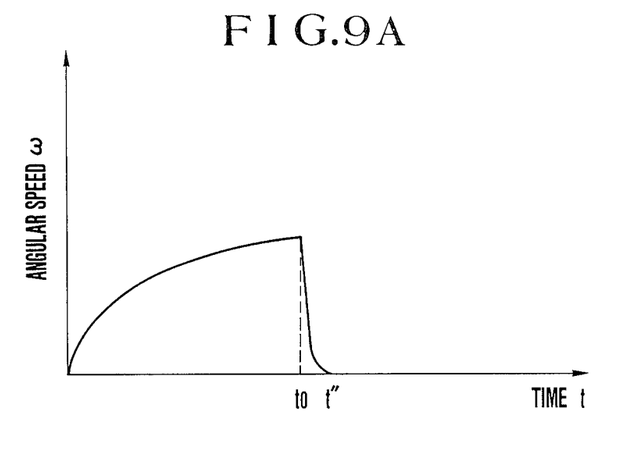
FIGS. 9A and 9B are graphs illustrating an improvement of the functions of the mechanism of FIGS. 5A, 5B and 6.
Figure 9B:
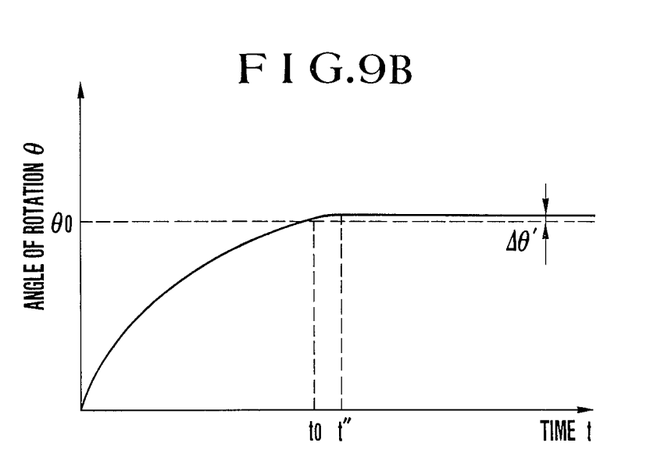

Also referring to FIGS. 9A and 9B, there are shown time response characteristics of the operation of the mechanism of the invention. The angular speed at which the diaphragm drive disc 23 rotates can decrease from the maximum to zero in a far shorter a time than that in the prior art mechanism shown in FIG. 4A. In FIG. 9B, the angular distance the disc 23 overruns is also remarkably reduced. That is, at a time point $t_0$, when the angle of rotation has reached a target value $\theta_0$, the current supply is cut off. With the help of a frictional force between the fixed disc 22 and the diaphragm blades 24 and between the latter and the drive disc 23, the diaphragm drive disc 23 is rapidly stopped in a delay time t''.

For this time t'', the angle of rotation increases from the above-identified value $\theta_0$ by angle $\Delta\theta'$. In comparison with the prior known mechanism of FIG. 4, it results that $\Delta\theta' < \Delta\theta$, revealing that the present invention can stop the diaphragm drive disc 23 in a very accurate position.

To achieve a further reduction of the excessive angle $\Delta\theta'$, means may be provided for cutting off the current supply not at the time point $t_0$ but at a point $(t_0-t'')$, or for controlling the current supply in accordance with the number of pulses produced from a pulse generator cooperating with the shutter blades 24.

Through the foregoing embodiment of the invention has been described with the diaphragm drive disc and the magnet ring 25 arranged as separate parts from each other, they may be formed asa unit by molding means with the use of a plastic magnet, thereby providing the advantage of reducing the production cost in respect to both part cost and assembling cost.

Another example of a modification is that instead of the drive coil having only one element for each direction of rotation, to increase the torque, an additional coil element may be employed on the opposite side to each of the elements 26a and 26b. Still another example is that as in the above-described embodiment, the maximum possible angle of rotation of the magnet ring 25 is not more than 90°, in order to extend the range of angles of rotation, two or more coil elements may be provided in each of the clockwise and counterclockwise directions, and the magnet ring 25 may be made of multiple poles.

Figure 10:
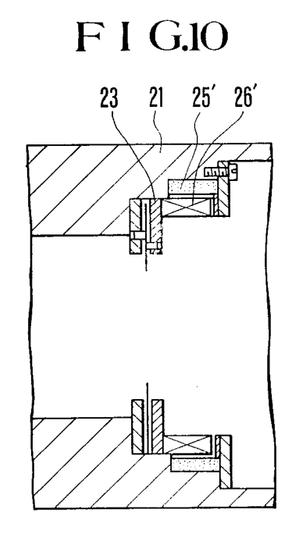
FIG. 10 is a longitudinal section view of the main parts of another embodiment of the invention.

Now, again, though in the foregoing embodiment of the invention, the diaphragm drive disc 23 is combined with the magnet ring 25, and the diaphragm drive coil 26 with the body tube 21, they may be otherwise combined as shown in FIG. 10 so that a diaphragm drive coil 26' is fixedly mounted to the diaphragm drive disc 23, and a magnet ring 25' to the body tube 21 to effect an equivalent result.

Also, in the embodiments of the invention, a lubricating treatment is employed in reducing the frictional force between the magnet ring 25 and the resilient member 29. But, a ball bearing or other more suitable means may be employed.

Further, for the purpose of obtaining the possibility of reducing the necessary number of parts and the number of assembling operations, the aforesaid magnet ring 25 and the diaphragm drive disc 23 may be otherwise constructed in the form of a unit by employing the molding techniques of synthetic resin material. In more detail, referring to FIG. 6, a cylindrical portion 25 and a disc-like flange portion at the front end of the cylindrical portion are made as a unit of synthetic resin containing finely divided magnetic material by molding means, and the cylindrical portion 25 is later magnetized. And, the aforesaid flange portion is later subjected to machining for forming cams for controlling the size of aperture defined by the diaphragm blades. In such a manner, the diaphragm drive member and the magnet part can be unified.

The present invention has the feature that as has been described above, with the use of a resilient member, the magnet ring and the diaphragm drive coil are axially offset so that when driving the diaphragm, the diaphragm drive disc rotates smoothly, and when the diaphragm adjusting operation is terminated, the diaphragm blades are accurately held in the prescribed axial position with the adjusted size of aperture of the diaphragm. Therefore, it produces advantages that the diaphragm blades enable an accurate amount of light to be obtained, the optical preformance is improved, the rotation of the diaphragm blades is also smooth, its response is quick, and the driving energy is also reduced.

While specific embodiments of the invention have been shown and described in detail to illustrate the application of the inventive principles, it will be understood that the invention may be embodied otherwise without departing from such principles.

Whis is claimed is:

1. A diaphragm driving device mounted in a lens barrel through which an optical axis passes, comprising:
   diaphragm blades;
   first and second operation members for supporting and operating said diaphragm blades, said first and second operation members being arranged to relatively rotate around the optical axis and being variable in their spacing in the direction of the optical axis;
   a magnetic member connecting to one of said first and second operation members;
   urging means for exerting a force in the direction of the optical axis on said first and second operation members to make them approach each other; and
   at least one coil member which, when supplied with current, rotates said magnetic member around said optical axis and shifts said magnetic member in the direction of said optical axis against the force of said urging means.

2. a diaphragm driving device according to claim 1, wherein said magnet member is of a cylindrical shape.

3. A diaphragm driving device mounted in a lens barrel through which an optical axis passes, comprising:
   diaphragm blades defining a size of an aperture opening around the optical axis;
   a support member for supporting said diaphragm blades;
   a diaphragm drive member drivingly connected to said diaphragm blades and controlling the size of the aperture opening in accordance with an amount of rotation thereof relative to said support member, said diaphragm blades being located between said support member and said diaphragm drive member;
   a magnet member fixedly secured to one of said support member and said diaphragm drive member;
   a drive coil constituting an electromagnetic induction mechanism together with said magnet member to selectively shift said magnet member along the optical axis; and
   a resilient member for urging said magnet member along the optical axis, wherein when said device is not being driven, said resilient member axially displaces said magnet member thereby causing said one of said support member and said diaphragm drive member, to which said magnet member is secured, to press said diaphragm blades between said support member and said diaphragm drive member holding said diaphragm blades by friction in a position defining a particular aperture opening size, and when said device is driven, a current supplied to said drive coil shifts said magnet member in opposition to the urging of said resilient member thereby releasing said diaphragm blades.

4. A diaphragm driving device according to claim 3, wherein said diaphragm drive member and said magnet member are constructed in a unified form of a cylindrical member by molding means with the use of synthetic resin material mixed with magnetic material, said cylinder being magnetized to serve as said magnet member, and a disc-like flange portion being formed at one end of said cylindrical member, and being provided with cam portions for controlling the rotation of said diaphragm blades.

* * * * *